United States Patent [19]

Akutin et al.

[11] 4,110,395

[45] Aug. 29, 1978

[54] PROCESS FOR PRODUCING POLYMERIC FILMS FROM CRYSTALLIZABLE POLYESTERS

[76] Inventors: Modest Sergeevich Akutin, Bolshoi Tishinsky pereulok, 26, korpus 16, kv. 16; Tamara Grigorievna Levina, Ljusinovskaya ulitsa, 66, kv. 242a, both of Moscow, U.S.S.R.

[21] Appl. No.: 733,944

[22] Filed: Oct. 19, 1976

Related U.S. Application Data

[63] Continuation of Ser. No. 551,850, Feb. 21, 1975, abandoned.

[51] Int. Cl.$^2$ ............................................. B29D 7/24
[52] U.S. Cl. ............................... 264/210 R; 264/216; 264/235; 264/289; 264/346
[58] Field of Search ................ 264/210 R, 216, 235, 264/288, 289, 346; 260/75 T

[56] References Cited

U.S. PATENT DOCUMENTS

| | | | |
|---|---|---|---|
| 2,823,421 | 2/1958 | Scarlett | 264/216 |
| 2,899,713 | 8/1959 | Lundsager | 264/320 |
| 2,968,065 | 1/1961 | Gronholz | 260/75 T |
| 2,995,779 | 8/1961 | Winter | 264/289 |
| 3,577,510 | 5/1974 | Schmitz et al. | 264/292 |
| 3,644,610 | 2/1972 | Buteux | 264/291 |
| 3,796,785 | 3/1974 | Rest et al. | 264/288 |
| 3,800,022 | 3/1974 | Buteux | 264/288 |
| 3,900,604 | 8/1975 | Tanabe et al. | 264/235 |

*Primary Examiner*—Jeffery R. Thurlow
*Attorney, Agent, or Firm*—Haseltine, Lake, & Waters

[57] ABSTRACT

A process for producing polymeric films from crystallizable polyesters, such as polyethylene terephthalate, comprising extruding a molten polymer onto a receiving surface with subsequent cooling of the polymer on said surface at 20°–80° C to obtain an amorphous polymeric film. This film is heat-treated at 130°–190° C to obtain a crystallinity of the film of 5–50%. Then the film is oriented at 130°–250° C, thermally fixed at 170°–250° C and cooled at 20°–30° C. Polymeric films produced by the above-described method have a high structural homogeneity and elevated physical and mechanical characteristics (ultimate tensile strength up to 4000 kg/cm$^2$, yield point up to 3500 kg/cm$^2$).

4 Claims, No Drawings

PROCESS FOR PRODUCING POLYMERIC FILMS FROM CRYSTALLIZABLE POLYESTERS

This is a continuation of application Ser. No. 551,850 filed Feb. 21, 1975, now abandoned.

The present invention relates to a process for producing polymeric films from crystallizable polyesters, such as polyethylene terephthalate. These films can be widely used in the manufacture of capacitors, in the electrotechnical industry as well for subsequent metal coating and for similar purposes.

It is known to produce polymeric films from crystallizable polyesters, such as polyethylene terephthalate by extruding a molten polymer to a receiving surface, cooling the polymer on this surface at 20–80° C. to obtain a polymeric film with as amorphous structure as possible. Then, in order to impart roughness to the film, it is heat treated at 130–190° C. to obtain a crystallinity below 5%. Then the film is oriented in one direction or biaxially at 80–125° C., thermally fixed at 170°–250° C. and cooled at a20°–30° C.

The prior art process is deficient in that the polymeric film having a low crystallinity (up to 5%) is oriented. The orientation of such films results in the production of oriented materials having a large number of structural defects, as well as an insufficient mechanical strength (tensile strength of the film is only up to 2500–3000 Kg/cm$^2$).

It is an object of the invention to provide a process for producing polymeric films from crystallizable polyesters, such as polyethylene terephthalate which provides polymeric films having a high structural homogeneity and elevated physical and mechanical characteristics, including high mechanical strength.

With this and other objects in view, the invention consists in that a molten polymer is extruded to a receiving surface, the polymer is cooled on said receiving surface at 20°–80° C. to obtain an amorphous polymeric film, and the film is heat treated at 130°–190° C. to obtain a crystallinity of the film of 5–50%, oriented at 130°–250° C., thermally fixed at 170°–250° C. and cooled at 20°–30° C.

Carrying out the heat treatment of the film up to the above-specified crystallinity and the orientation of the film within the above-mentioned temperature limits provides polymeric films exhibiting a high structural homogeneity and elevated physical and mechanical characteristics (ultimate tensile strength of the film up to 4000 kg/cm$^2$, yield point up to 3500 kg/cm$^2$).

If necessary, the film can be cooled at 20°–80° C after the heat treatment and prior to the orientation.

The process for producing polymeric films according to the invention is preferably effected as follows.

Polyethyleneterephthalate, which can be dried if necessary, is extruded in the molten state from an extruder or directly from a molding head of a polycondensation reactor onto a receiving surface. The polymer is cooled on this surface at 20°–80° C. to obtain an amorphous polymeric film. The resulting film is heated treated at 130°–190° C. to obtain a crystallinity of the film from 5 to 50%. The heat treatment may be effected by any appropriate method, such as by using hot air or any other appropriate inert heating medium. The crystallized polymeric film is then oriented either in one direction, or in two relatively orthogonal directions (biaxial orientation). In the latter case the orientation may be effected simultaneously or independently. The orientation of the polymeric film is conducted at a temperature above the vitrification point but below the melting point, that is within the temperature range from 130° to 250° C. Specific values of the rate, temperature and coefficients of orientation depend on the crystallinity of the polymeric films with any orientation method. Thus, the higher the crystallinity of the film, the higher the temperature and the lower the rate and coefficients of orientation. The oriented film is then thermally fixed in a tensioned state at 170°–250° C. for relieving internal stresses in the film, whereafter the film is cooled at 20°–30° C.

The invention will be better understood from the following examples of specific embodiments thereof.

EXAMPLE 1

An amorphous polymeric film was obtained by extruding molten polyethylene terephthalate from an extruder to a receiving surface of a roll at the surface temperature of 60° C. Then the resulting amorphous film was heat treated in a heat chamber in a tensioned state at 140° C. for 10 minutes to obtain a crystallinity of 20.4% and cooled at 20° C. Then a biaxial orientation of the film was effected, first, in the longitudinal direction at 170° C. at a rate of 500% per minute, and then in the transverse direction at 190° C. at the same rate. The oriented film in the tensioned state was thermally fixed at 200° C. and cooled at 20°–30° C.

The polymeric film thus obtained had a defectless structure (that is a high optical homogeneity); tensile strength was 4000 kg/cm$^2$, yield point 3500 kg/cm$^2$.

EXAMPLE 2

Molten polyethyleneterephthalate was poured from an extruding head of a polycondensation reactor to a metal strip at 80° C. The polymer was cooled on this strip to obtain an amorphous polymeric film. The film was heat treated at 190° C. for 10 minutes to obtain a crystallinity of 50%. Then the film was fed, without cooling, to the orientation chamber, wherein the film was concurrently stretched in the longitudinal and transverse directions at 240° C. at a rate of 1500% per minute. The oriented film was thermally fixed at 250° C. and subsequently cooled at 20°–30° C.

The resulting polymeric film had a defectless structure; tensile strength was 3600 kg/cm$^2$; yield point 3000 kg/cm$^2$.

EXAMPLE 3

An amorphous polymeric film was obtained by extruding molten polyethylene terephthalate from an extruder to a receiving surface of a roll at 20° C. Then the resulting amorphous film was heat treated in a tensioned state at 130° C. for 3 minutes to obtain a crystallinity of 5.5% with subsequent cooling at 80° C. Then the film was fed into a chamber for orientation concurrently in the longitudinal and transverse directions at 130° C. at a rate of 2000% per minute. The oriented film was then thermally fixed in the tensioned state at 170° C. and cooled at 20°–30° C.

The polymeric film thus obtained had a high structural homogeneity; tensile strength was 3950 kg/cm$^2$, yield point 3300 kg/cm$^2$.

What is claimed is:

1. A process for producing polymeric polyethyleneterephthalate films, comprising the extrusion of molten polyethyleneterephthalate polymer onto a receiving surface; cooling said polymer on said receiving surface to a temperature of 20°–80° C. to obtain an amorphous polymeric film; heat treating said film at 130°–190° C. to obtain a degree of crystallinity of the film of from 5 to 50%; biaxially orienting said film at 130°–250° C.; thermal fixation thereof at 170°–250° C. and cooling to 20°–30° C.

2. The process of claim 1, wherein the biaxial orientation of said film is simultaneously conducted in both directions until an ultimate strength of the film of 3600 kg/cm² is reached.

3. The process of claim 1, wherein the biaxial orientation of said film is conducted consecutively: first in a longitudinal, and then in a lateral direction until an ultimate strength of the film of 3600 kg/cm² is reached.

4. The process of claim 1, wherein the polymer film is cooled to 20°–80° C. after heat treatment and prior to the orientation.